United States Patent
Seki et al.

(10) Patent No.: US 10,865,883 B2
(45) Date of Patent: Dec. 15, 2020

(54) SEALING RING

(71) Applicants: NOK CORPORATION, Tokyo (JP); EAGLE INDUSTRY CO., LTD., Tokyo (JP)

(72) Inventors: Masatoshi Seki, Kitaibaraki (JP); Takeshi Hosoe, Tokyo (JP); Hideyuki Inoue, Tokyo (JP); Yuichiro Tokunaga, Tokyo (JP)

(73) Assignees: NOK CORPORATION, Tokyo (JP); EAGLE INDUSTRY CO., LTD., Tokyo (JP)

(*) Notice: Subject to any disclaimer, the term of this patent is extended or adjusted under 35 U.S.C. 154(b) by 154 days.

(21) Appl. No.: 15/113,506

(22) PCT Filed: Jan. 23, 2015

(86) PCT No.: PCT/JP2015/051869
§ 371 (c)(1),
(2) Date: Jul. 22, 2016

(87) PCT Pub. No.: WO2015/111707
PCT Pub. Date: Jul. 30, 2015

(65) Prior Publication Data
US 2017/0009889 A1 Jan. 12, 2017

(30) Foreign Application Priority Data
Jan. 24, 2014 (JP) .................. 2014-011035

(51) Int. Cl.
*F16J 15/44* (2006.01)
*F16J 15/16* (2006.01)
*F16J 15/3272* (2016.01)

(52) U.S. Cl.
CPC ........... *F16J 15/441* (2013.01); *F16J 15/164* (2013.01); *F16J 15/3272* (2013.01)

(58) Field of Classification Search
CPC ...... F16J 15/34; F16J 15/3404; F16J 15/3408; F16J 15/3412; F16J 15/3416;
(Continued)

(56) References Cited

U.S. PATENT DOCUMENTS 4,211,424 A * 7/1980 Stein ..................... F01D 11/003
277/352
4,458,717 A * 7/1984 Boland ................ F15B 15/223
137/496
(Continued)

FOREIGN PATENT DOCUMENTS

CN    1197172 A  * 10/1998
CN    1197172 A    10/1998
(Continued)

OTHER PUBLICATIONS

Chinese Office Action dated Sep. 8, 2017 with English translation.
(Continued)

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

Provided is a sealing device capable of suppressing leakage of a fluid to be sealed while reducing rotary torque regardless of rotational direction. In a sealing ring (100) slides against a side wall surface on a low pressure side of an annular groove, a dynamic pressure generating groove (120) that includes a first groove (121) having a constant width in a radial direction and extending in a circumferential direction and a second groove (122) extending from a center position of the first groove (121) in the circumferential direction to an inner circumferential surface and guiding a fluid to be sealed into the first groove (121) is provided on a sliding surface side which slides against the side wall
(Continued)

surface. The first groove (121) is provided at a position within a sliding region in which the sealing ring slides against the side wall surface.

2 Claims, 8 Drawing Sheets

(58) Field of Classification Search
CPC .... F16J 15/342; F16J 15/3424; F16J 15/3428; F16J 15/3432; F16J 15/441
See application file for complete search history.

(56) References Cited

U.S. PATENT DOCUMENTS

| | | | | |
|---|---|---|---|---|
| 5,066,026 | A * | 11/1991 | Heck | F16J 15/3412 |
| | | | | 277/400 |
| 5,368,314 | A | 11/1994 | Victor et al. | |
| 5,385,409 | A * | 1/1995 | Ide | F16J 15/3432 |
| | | | | 277/400 |
| 5,447,316 | A * | 9/1995 | Matsui | F16J 15/3412 |
| | | | | 277/400 |
| 5,509,664 | A * | 4/1996 | Borkiewicz | F16J 15/442 |
| | | | | 277/543 |
| 5,558,341 | A * | 9/1996 | McNickle | F16J 15/3488 |
| | | | | 277/400 |
| 6,290,235 | B1 * | 9/2001 | Albertson | F16J 15/002 |
| | | | | 277/510 |
| 6,446,976 | B1 * | 9/2002 | Key | F16J 15/3416 |
| | | | | 277/367 |
| 9,239,113 | B2 * | 1/2016 | Nagai | F16J 15/441 |
| 9,695,940 | B2 * | 7/2017 | Haynes | F16J 15/442 |
| 2012/0018957 | A1 * | 1/2012 | Watanabe | F16J 15/441 |
| | | | | 277/387 |
| 2014/0008876 | A1 | 1/2014 | Nagai et al. | |

FOREIGN PATENT DOCUMENTS

| | | | | |
|---|---|---|---|---|
| CN | 103415730 A | | 11/2013 | |
| JP | S63-190975 A | | 8/1988 | |
| JP | H03-88062 U | | 9/1991 | |
| JP | H09-210211 A | | 8/1997 | |
| KR | 20130100004 A | * | 9/2013 | ............ F16J 15/441 |
| WO | 2011/105513 A1 | | 9/2011 | |
| WO | 2013/094657 A1 | | 6/2013 | |

OTHER PUBLICATIONS

Extended European Search Report dated Oct. 11, 2017.
Chinese Office Action dated Feb. 4, 2017 with English translation.
Japanese Office Action dated Dec. 5, 2017 corresponding to Japanese Application No. 2015-559134.
Japanese Notice of Reasons for Revocation dated Dec. 5, 2019 with English translation (corresponding to JP 2018-026070).

* cited by examiner

SEALING RING

CROSS-REFERENCE TO RELATED APPLICATIONS

This application is a National Stage of International Application No. PCT/JP2015/051869, filed Jan. 23, 2015 (now WO 2015/111707 A1), which claims priority to Japanese Application No. 2014-011035, filed Jan. 24, 2014. The entire disclosures of each of the above applications are incorporated herein by reference.

FIELD

The present disclosure relates to a sealing ring for sealing an annular gap between a shaft and a shaft hole of a housing.

BACKGROUND

An automatic transmission (AT) or a continuously variable transmission (CVT) of an automobile is provided with a sealing ring that seals an annular gap between a shaft and a housing which rotate relative to each other in order to maintain hydraulic pressure. In recent years, reduction in fuel consumption is being promoted as a measure to address environmental problems and, as far as sealing rings are concerned, demands are increasing for reducing rotary torque. In consideration thereof, techniques in which a groove for guiding a fluid to be sealed is provided on a sliding surface side of a sealing ring are conventionally known (refer to Patent Literatures 1 and 2).

However, there is still room for improvement such as addressing demands for reducing rotary torque regardless of rotational direction. In addition, there is a need for suppressing leakage of a fluid to be sealed which is an intrinsic function of a sealing ring.

CITATION LIST

Patent Literature

Patent Literature 1: Japanese Utility Model Application Laid-open No. H03-088062
Patent Literature 2: WO 2011/105513

SUMMARY TECHNICAL PROBLEM

An object of the present disclosure is to provide a sealing device capable of suppressing leakage of a fluid to be sealed while reducing rotary torque regardless of rotational direction.

Solution to Problem

In order to solve the problem described above, the present disclosure adopts the following means.

Specifically, a sealing ring according to the present disclosure is a sealing ring which is mounted to an annular groove provided on an outer circumference of a shaft and seals an annular gap between the shaft and a housing that rotate relative to each other to maintain fluid pressure of a region to be sealed that is configured such that the fluid pressure thereof changes, wherein the sealing ring slides against a side wall surface on a low pressure side of the annular groove, a dynamic pressure generating groove which includes a first groove having a constant width in a radial direction and extending in a circumferential direction and a second groove extending from a center position of the first groove in the circumferential direction to an inner circumferential surface and guiding a fluid to be sealed into the first groove is provided on a sliding surface side which slides against the side wall surface, and the first groove is provided at a position within a sliding region which slides against the side wall surface.

According to the present disclosure, a fluid to be sealed is guided into the dynamic pressure generating groove. As a result, within a range in which the dynamic pressure generating groove is provided, fluid pressure that acts on the sealing ring from a high pressure side and fluid pressure that acts on the sealing ring from a low pressure side cancel each other out. Accordingly, a pressure receiving area of fluid pressure with respect to the sealing ring can be reduced. In addition, when the sealing ring slides against a side wall surface on a low pressure side of the annular groove, dynamic pressure is generated as the fluid to be sealed flows out from the first groove to a sliding portion. Accordingly, a force in a direction away from the side wall surface is generated with respect to the sealing ring. As described thus far, a combination of the reduction in the pressure receiving area and the generation of a force in a direction away from the side wall surface with respect to the sealing ring due to dynamic pressure makes it possible to effectively reduce rotary torque.

In addition, the dynamic pressure generating groove is configured so as to include the first groove and the second groove which extends from a center in a circumferential direction of the first groove to an inner circumferential surface. Therefore, the dynamic pressure described above is generated regardless of a rotational direction of the sealing ring with respect to the annular groove.

Furthermore, since the first groove is provided at a position within a sliding region in which the sealing ring slides against the side wall surface, leakage of the fluid to be sealed can be suppressed.

A groove bottom of the first groove may be configured such that both end sides thereof are shallower than a center in the circumferential direction.

Accordingly, the dynamic pressure described above can be effectively generated due to a wedge effect.

Advantageous Effects of the Disclosure

As described above, according to the present disclosure, leakage of a fluid to be sealed can be suppressed while reducing rotary torque regardless of rotational direction.

DETAILED DESCRIPTION

Hereinafter, modes for implementing the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described. Moreover, a sealing ring according to the present examples is used for the purpose of sealing an annular gap between a shaft and a housing which rotate relative to each other in order to maintain hydraulic pressure in a transmission such as an AT or a CVT of an automobile. In addition, in the following description, a "high pressure side" refers to a side with higher pressure when differential pressure is created between both sides of a sealing ring and a "low pressure side" refers to a side with lower pressure when differential pressure is created between both sides of a sealing ring.

Example 1

Figure 1:
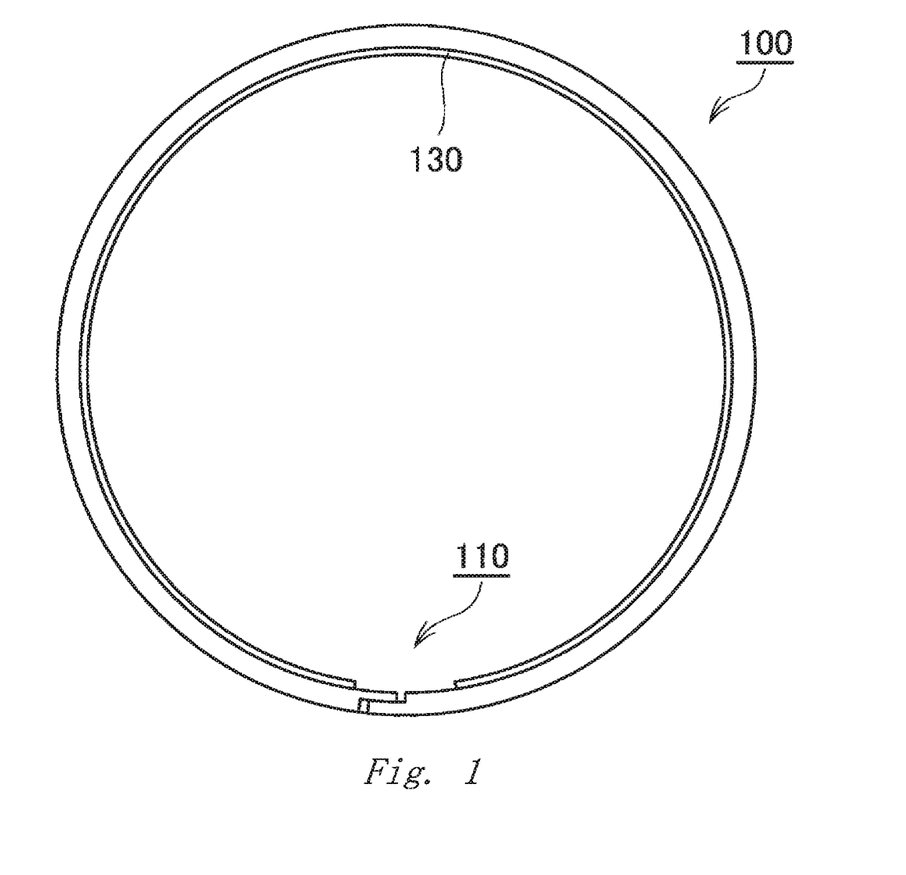
FIG. 1 is a side view of a sealing ring according to an Example 1 of the present disclosure.
Figure 2:
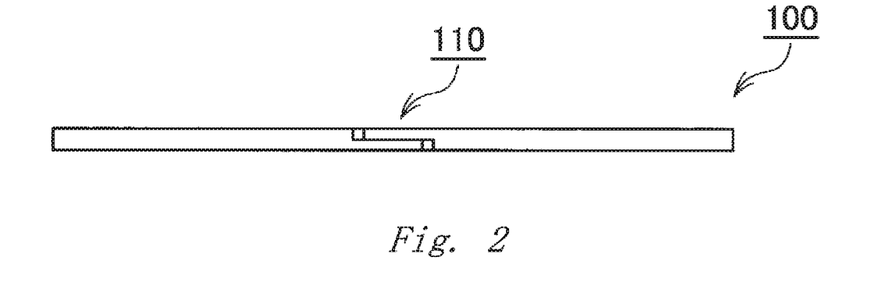
FIG. 2 is a diagram of the sealing ring according to the Example 1 of the present disclosure as viewed from an outer circumferential surface side.
Figure 3:
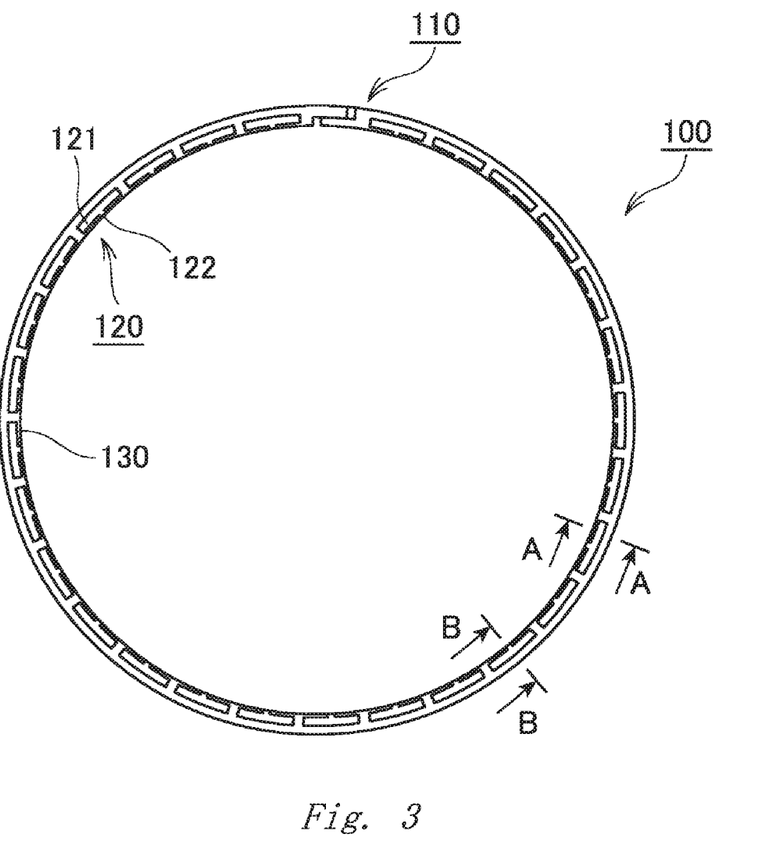
FIG. 3 is a side view of the sealing ring according to the Example 1 of the present disclosure.
Figure 4:
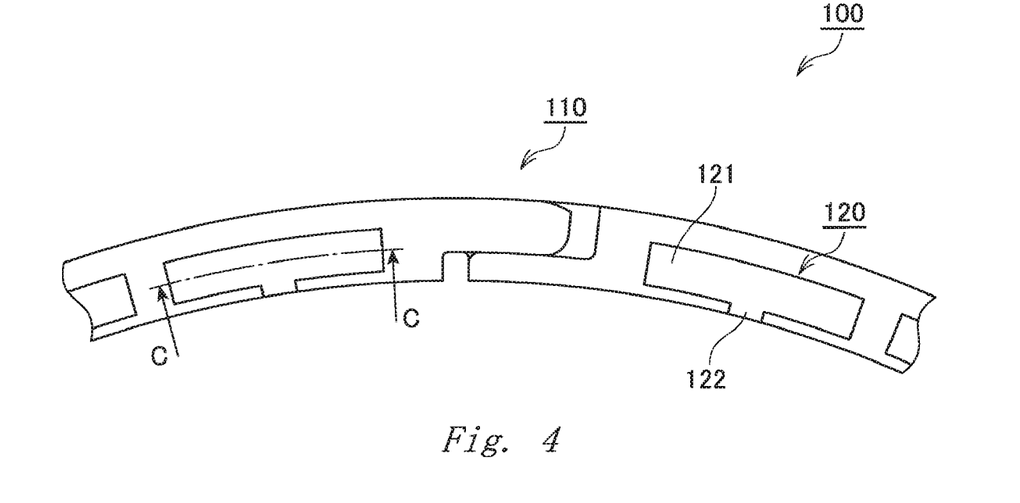
FIG. 4 is a partially enlarged view of a side view of the sealing ring according to the Example 1 of the present disclosure.
Figure 5:
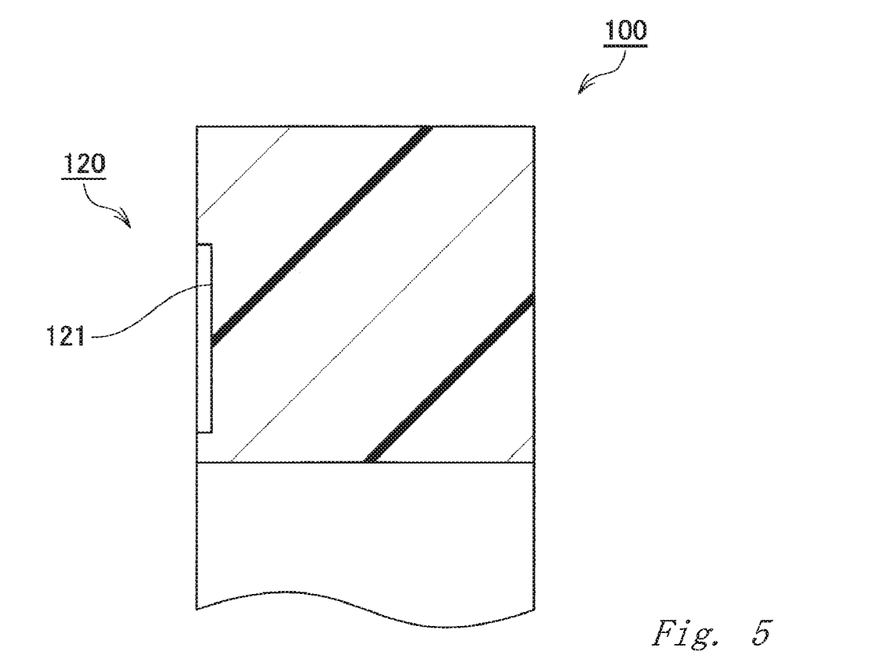
FIG. 5 is a schematic sectional view of the sealing ring according to the Example 1 of the present disclosure.
Figure 6:
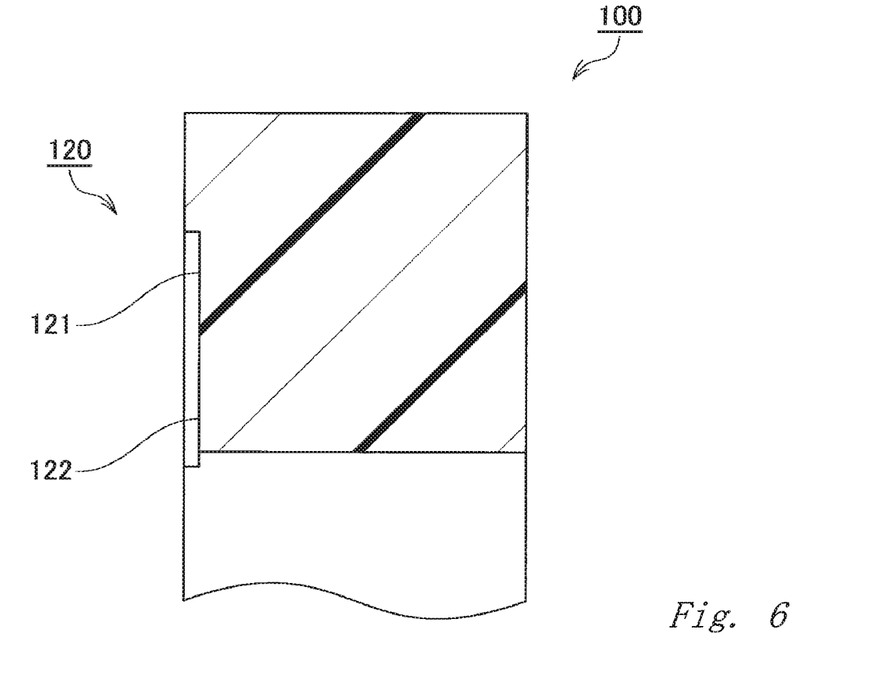
FIG. 6 is a schematic sectional view of the sealing ring according to the Example 1 of the present disclosure.
Figure 7:
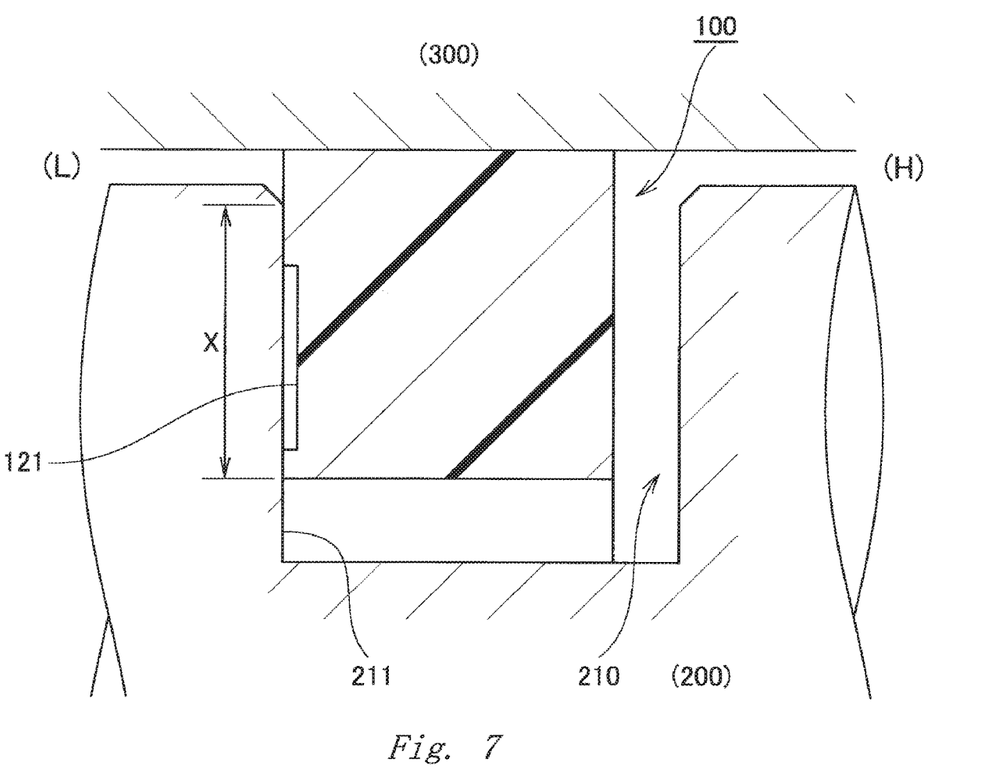
FIG. 7 is a schematic sectional view showing a usage state of the sealing ring according to the Example 1 of the present disclosure.

A sealing ring according to an example of the present disclosure will be described with reference to FIGS. 1 to 12. FIG. 1 is a side view of a sealing ring according to an Example 1 of the present disclosure. Moreover, FIG. 1 shows a side surface on an opposite side to a sliding surface of the sealing ring. FIG. 2 is diagram of the sealing ring according to the Example 1 of the present disclosure as viewed from an outer circumferential surface side. FIG. 3 is a side view of the sealing ring according to the Example 1 of the present disclosure. Moreover, FIG. 3 shows a side surface on a sliding surface side of the sealing ring. FIG. 4 is a partially enlarged view of a side view of the sealing ring according to the Example 1 of the present disclosure. Moreover, FIG. 4 is a diagram showing an enlargement of a vicinity where an abutment portion 110 is provided in FIG. 3. FIG. 5 is a schematic sectional view of the sealing ring according to the Example 1 of the present disclosure. Moreover, FIG. 5 is a sectional view taken along AA in FIG. 3. FIG. 6 is a schematic sectional view of the sealing ring according to the Example 1 of the present disclosure. Moreover, FIG. 6 is a sectional view taken along BB in FIG. 3. FIG. 7 is a schematic sectional view showing a usage state of the sealing ring according to the Example 1 of the present disclosure. Moreover, the sealing ring shown in FIG. 7 represents a sectional view taken along AA in FIG. 3. FIGS. 8 to 12 are schematic sectional views of the sealing ring according to the Example 1 of the present disclosure. Moreover, FIGS. 8 to 12 are sectional views taken along CC in FIG. 4.

<Configuration of Sealing Ring>

A sealing ring 100 according to the present Example is mounted to an annular groove 210 provided on an outer circumference of a shaft 200 and seals an annular gap between the shaft 200 and a housing 300 (an inner circumferential surface of a shaft hole of the housing 300 into which the shaft 200 is to be inserted) which rotate relative to each other. Accordingly, the sealing ring 100 maintains fluid pressure of a region to be sealed which is configured such that fluid pressure (in the present Example, hydraulic pressure) changes. In this case, the present Example is configured such that fluid pressure of a right-side region in FIG. 7 changes, and the sealing ring 100 is responsible for maintaining fluid pressure of a region to be sealed on a right side of the diagram. Moreover, in a state where an engine of an automobile is stopped, the region to be sealed has low fluid pressure with no load applied thereto, and the fluid pressure of the region to be sealed rises once the engine is turned on. In addition, FIG. 7 shows a state where fluid pressure of the right side of the diagram is higher than fluid pressure of the left side. Hereinafter, the right side in FIG. 7 will be referred to as a high pressure side (H) and the left side will be referred to as a low pressure side (L).

The sealing ring 100 is made of a resin material such as polyether ether ketone (PEEK), polyphenylene sulfide (PPS), and polytetrafluoroethylene (PTFE). In addition, a circumferential length of an outer circumferential surface of the sealing ring 100 is configured to be shorter than a circumferential length of an inner circumferential surface of the shaft hole of the housing 300 so as not to have a fastening margin. Therefore, in a state where fluid pressure is not applied, the outer circumferential surface of the sealing ring 100 may be separated from the inner circumferential surface of the housing 300.

An abutment portion 110 is provided at one location in a circumferential direction of the sealing ring 100. In addition, a dynamic pressure generating groove 120 is provided on a sliding surface side of the sealing ring 100. Moreover, the sealing ring 100 according to the present Example is configured such that the abutment portion 110 and a plurality of the dynamic pressure generating grooves 120 are formed in an annular member with a rectangular cross section. However, this is simply a description of a shape and does not necessarily mean that a process of forming the abutment portion 110 and the plurality of the dynamic pressure generating grooves 120 is performed using an annular member with a rectangular cross section as a material. Obviously, the abutment portion 110 and the plurality of the dynamic pressure generating grooves 120 can be obtained by machining after forming an annular member with a rectangular cross section. However, for example, the plurality of the dynamic pressure generating grooves 120 can be obtained by machining, after molding an annular member which already includes the abutment portion 110 and a manufacturing method is not particularly limited.

For the abutment portion 110, a so-called special step cut is adopted in which the abutment portion 110 is cut in steps when viewed from a side of the outer circumferential surface as well as from sides of both side wall surfaces. Although a detailed description of the special step cut will be omitted since the special step cut is a known technique, the special step cut characteristically enables stable sealing performance to be retained even when a circumferential length of the sealing ring 100 changes due to thermal expansion and contraction. While the special step cut has been described as an example of the abutment portion 110, the abutment portion 110 is not limited thereto and a straight cut, a bias cut, a step cut, and the like may also be adopted. Moreover, when a material with low elasticity (such as PTFE) is adopted as the material of the sealing ring 100, the sealing ring 100 may be configured so as to be endless without providing the abutment portion 110.

The dynamic pressure generating groove 120 is provided in plurality at regular intervals over an entire circumference with the exception of a vicinity of the abutment portion 110 of a side surface on a sliding surface side of the sealing ring 100 (refer to FIG. 3). The plurality of dynamic pressure generating grooves 120 are provided in order to generate dynamic pressure when the sealing ring 100 slides against a side wall surface 211 on a low pressure side in the annular groove 210 provided on the shaft 200. In addition, the dynamic pressure generating groove 120 is constituted by a first groove 121 which has a constant width in a radial direction and which extends in a circumferential direction and a second groove 122 which extends from a center position of the first groove 121 in the circumferential direction to an inner circumferential surface and which guides a fluid to be sealed into the first groove 121.

Figure 8:
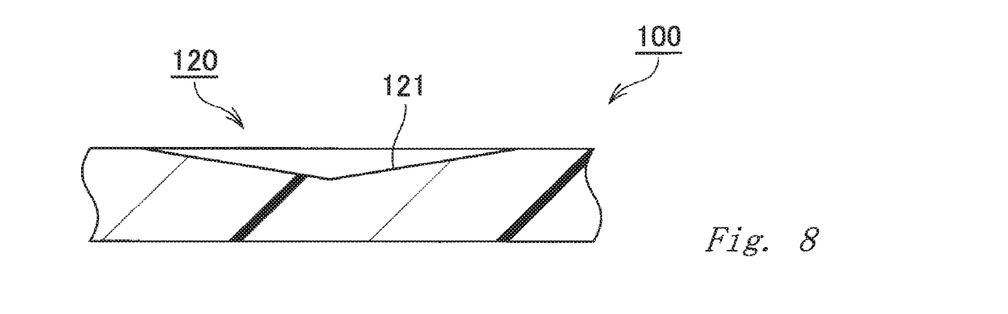
FIG. 8 is a schematic sectional view of the sealing ring according to the Example 1 of the present disclosure.
Figure 9:
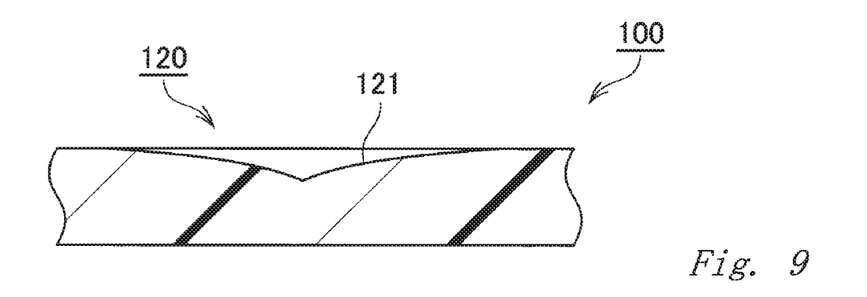
FIG. 9 is a schematic sectional view of the sealing ring according to the Example 1 of the present disclosure.
Figure 10:
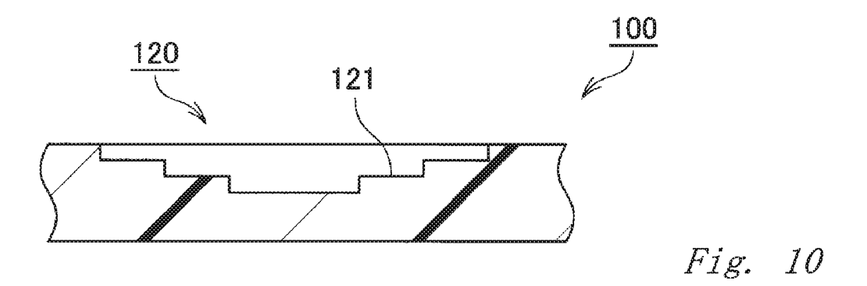
FIG. 10 is a schematic sectional view of the sealing ring according to the Example 1 of the present disclosure.
Figure 11:
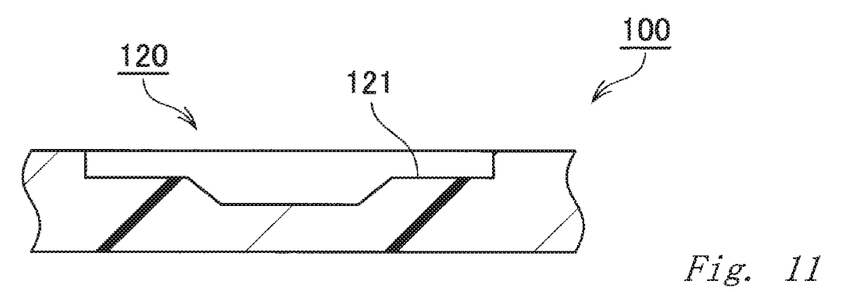
FIG. 11 is a schematic sectional view of the sealing ring according to the Example 1 of the present disclosure.
Figure 12:
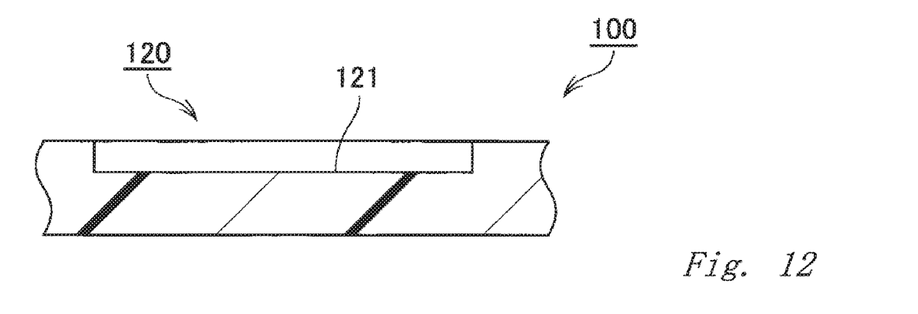
FIG. 12 is a schematic sectional view of the sealing ring according to the Example 1 of the present disclosure.

The first groove 121 is provided at a position within a sliding region X in which the sealing ring slides against the side wall surface 211 on the low pressure side in the annular groove 210 (refer to FIG. 7). In addition, a groove depth of the first groove 121 is configured such that a depth in the radial direction is constant (refer to FIGS. 5 and 7). Meanwhile, various configurations may be adopted for the groove depth of the first groove 121 in a circumferential direction. This aspect will be described with reference to FIGS. 8 to 12. FIGS. 8 to 11 show various examples in which a groove bottom of the first groove 121 is configured such that both end sides are shallower than a center in the circumferential direction. FIG. 8 shows an example in which the groove bottom of the first groove 121 becomes gradually shallower from the center toward both sides in the circumferential direction in a planar manner. FIG. 9 shows an example in which the groove bottom of the first groove 121 becomes gradually shallower from the center toward both sides in the circumferential direction in a manner of a curved plane. FIG. 10 shows an example in which the groove bottom of the first groove 121 becomes gradually shallower from the center toward both sides in the circumferential direction in stepped patterns. FIG. 11 shows an example in which the groove bottom of the first groove 121 becomes gradually shallower from the center toward both sides in the circumferential direction in stepped patterns and, at the same time, stepped portions are constituted by inclined surfaces. As described above, by configuring the groove bottom of the first groove 121 so that both end sides are shallower than a center in the circumferential direction, dynamic pressure can be generated more effectively due to a wedge effect. However, dynamic pressure can be generated to a certain degree even when the groove bottom of the first groove 121 is configured to be constant in the circumferential direction. Moreover, the first groove 121 according to the present Example is set so that a depth of a deepest portion thereof is 50 μm or less.

<Mechanism During Use of Sealing Ring>

A mechanism during use of the sealing ring 100 according to the present Example will be described with reference to FIG. 7, in particular. FIG. 7 shows a state where the engine has been turned on and differential pressure is created via the sealing ring 100 (a state where pressure on a right side of the diagram is higher than pressure on a left side of the diagram). In the state where the engine has been turned on and differential pressure has been created, the sealing ring 100 is in close contact with the side wall surface 211 of a low pressure side (L) of the annular groove 210 and with the inner circumferential surface of the shaft hole of the housing 300.

Accordingly, the annular gap between the shaft 200 and the housing 300 which rotate relative to each other can be sealed to maintain fluid pressure of the region to be sealed (a high pressure side (H) region) configured such that fluid pressure changes. In addition, when the shaft 200 and the housing 300 rotate relative to each other, sliding occurs between the side wall surface 211 on the low pressure side (L) of the annular groove 210 and the sealing ring 100. Furthermore, dynamic pressure is generated when a fluid to be sealed flows out to the sliding portion from the dynamic pressure generating groove 120 provided on a side surface on the sliding surface side of the sealing ring 100. Moreover, when the sealing ring 100 rotates in a clockwise direction in FIG. 3 with respect to the annular groove 210, the fluid to be sealed flows out to the sliding portion from an end section on a side of a counterclockwise direction of the first groove 121. In addition, when the sealing ring 100 rotates in a counterclockwise direction in FIG. 3 with respect to the annular groove 210, the fluid to be sealed flows out to the sliding portion from an end section on a side of a clockwise direction of the first groove 121.

<Advantages of Sealing Ring According to Present Example>

With the sealing ring 100 according to the present Example, a fluid to be sealed is guided into the dynamic pressure generating groove 120. As a result, within a range in which the dynamic pressure generating groove 120 is provided, fluid pressure that acts on the sealing ring 100 from a high pressure side (H) and fluid pressure that acts on the sealing ring 100 from a low pressure side (L) cancel each other out. Accordingly, a pressure receiving area of fluid pressure with respect to the sealing ring 100 (fluid pressure from the high pressure side (H) to the low pressure side (L)) can be reduced.

In addition, when the sealing ring 100 slides against the side wall surface 211 on the low pressure side of the annular groove 210, dynamic pressure is generated as the fluid to be sealed flows out from the first groove 121 to a sliding portion. Accordingly, a force in a direction away from the side wall surface 211 is generated with respect to the sealing ring 100.

As described above, a combination of the reduction in the pressure receiving area and the generation of a force in a direction away from the side wall surface 211 with respect to the sealing ring 100 due to dynamic pressure makes it possible to effectively reduce rotary torque. Achieving a reduction in rotary torque (sliding torque) in this manner enables generation of heat due to sliding to be suppressed and enables the sealing ring 100 according to the present Example to be favorably used even under high-speed high-pressure environmental conditions. In addition, accordingly, a soft material such as aluminum can be used as the material of the shaft 200.

In addition, the dynamic pressure generating groove 120 is configured so as to include the first groove 121 and the second groove 122 which extends from a center in a circumferential direction of the first groove 121 to an inner circumferential surface. Therefore, the dynamic pressure described above is generated regardless of a rotational direction of the sealing ring 100 with respect to the annular groove 210.

Furthermore, since the first groove 121 is provided at a position within a sliding region X in which the sealing ring slides against the side wall surface 211, leakage of the fluid to be sealed can be suppressed.

Moreover, as shown in FIGS. 8 to 11, by configuring the groove bottom of the first groove 121 so that both end sides are shallower than the center in a circumferential direction, the dynamic pressure can be generated effectively due to a wedge effect. In particular, as shown in FIGS. 8 and 9, by adopting a configuration in which the groove bottom of the first groove 121 becomes gradually shallower from the center toward both sides in a circumferential direction, the wedge effect can be demonstrated in a stable manner even if abrasion of a sliding-side side surface of the sealing ring 100 advances over time.

Example 2

FIGS. 13 to 19 show an Example 2 of the present disclosure. In the present Example, a configuration will be described in which, in the dynamic pressure generating groove, a depth of a portion that connects to the second groove in the first groove is set the same as a depth of the second groove and deeper than portions of the first groove other than the portion that connects to the second groove. Since other components and effects are the same as those of the Example 1, the same components will be denoted by the same reference characters and a description thereof will be omitted.

Figure 13:
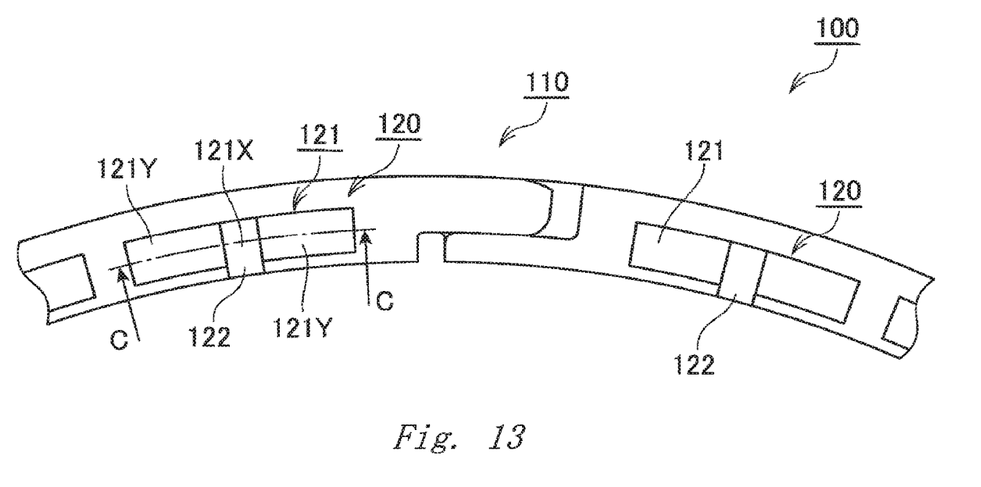
FIG. 13 is a partially enlarged view of a side view of a sealing ring according to an Example 2 of the present disclosure.

FIG. 13 is a partially enlarged view of a side view of a sealing ring according to the Example 2 of the present disclosure and corresponds to FIG. 4 according to the Example 1. FIGS. 14 to 19 are schematic sectional views of the sealing ring according to the Example 2 of the present disclosure. Moreover, FIGS. 14 to 19 are sectional views taken along CC in FIG. 13.

The present Example only differs from the Example 1 in the configuration of the dynamic pressure generating groove. Since other components are the same as those of the Example 1, descriptions thereof will be omitted. In a sealing ring 100 according to the present Example, a dynamic pressure generating groove 120 is similarly provided in plurality at regular intervals over an entire circumference with the exception of a vicinity of an abutment portion 110 of a side surface on a sliding surface side of the sealing ring 100. In addition, in a similar manner to the Example 1, the dynamic pressure generating groove 120 is constituted by a first groove 121 which has a constant width in a radial direction and which extends in a circumferential direction and a second groove 122 which extends from a center position of the first groove 121 in the circumferential direction to an inner circumferential surface and which guides a fluid to be sealed into the first groove 121.

Furthermore, the present Example is also similar to the Example 1 in that the first groove 121 is provided at a position within a sliding region X in which the sealing ring slides against a side wall surface 211 on a low pressure side in an annular groove 210 (refer to FIG. 7). Moreover, the present Example is also similar to the Example 1 in that a groove depth of the first groove 121 is configured so as to be constant in the radial direction.

In addition, in the dynamic pressure generating groove 120 according to the present Example, a depth of a portion 121X that connects to the second groove 122 in the first groove 121 is configured to be the same as a depth of the second groove 122 and deeper than portions 121Y of the first groove 121 other than the portion that connects to the second groove 122. Various configurations may be adopted for the groove depth of the first groove 121 in a circumferential direction. This aspect will be described with reference to FIGS. 14 to 19.

Figure 14:
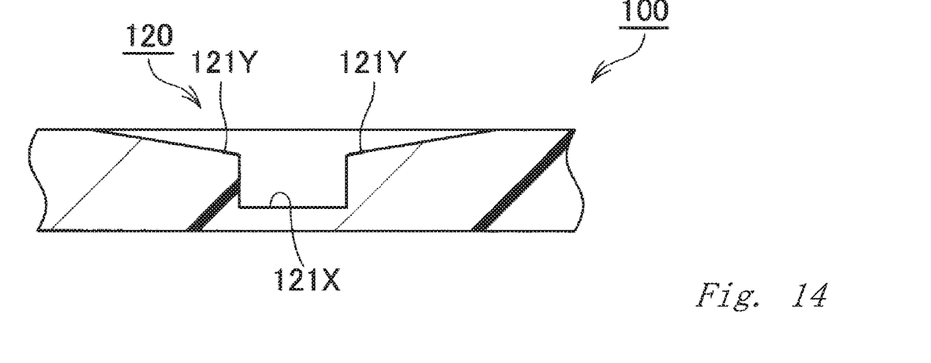
FIG. 14 is a schematic sectional view of the sealing ring according to the Example 2 of the present disclosure.
Figure 15:
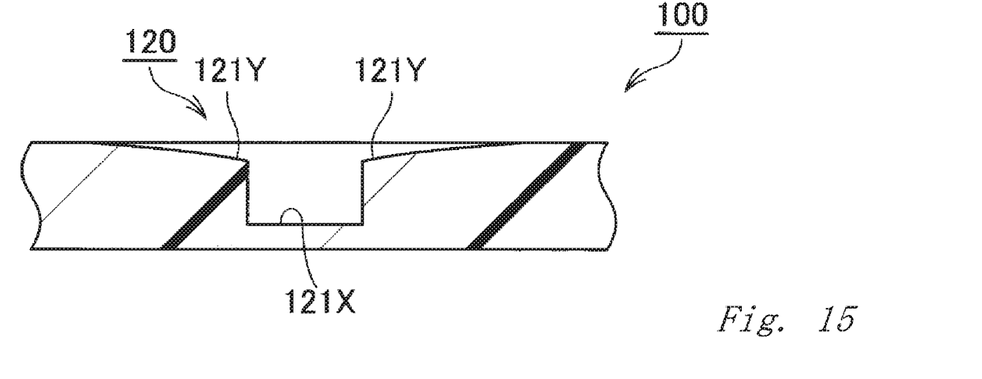
FIG. 15 is a schematic sectional view of the sealing ring according to the Example 2 of the present disclosure.
Figure 16:
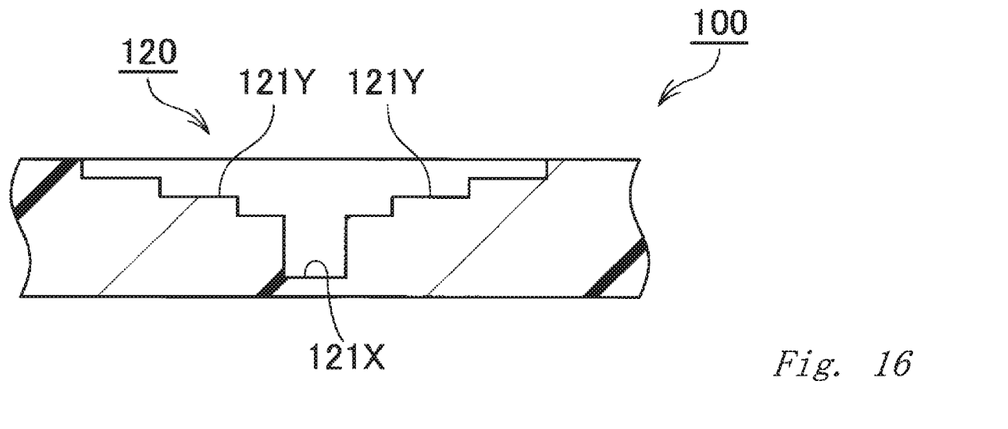
FIG. 16 is a schematic sectional view of the sealing ring according to the Example 2 of the present disclosure.

FIGS. 14 to 19 show various examples in which the groove bottom of the first groove 121 is configured such that both end sides are shallower than a center in the circumferential direction. FIG. 14 shows a modification of the example according to the Example 1 shown in FIG. 8 in which the groove bottom of the first groove 121 becomes gradually shallower from the center toward both sides in the circumferential direction in a planar manner. In addition, a depth of the portion 121X that connects to the second groove 122 in the first groove 121 is set deeper than the other portions 121Y. FIG. 15 shows a modification of the example according to the Example 1 shown in FIG. 9 in which the groove bottom of the first groove 121 becomes gradually shallower from the center toward both sides in the circumferential direction in a manner of a curved plane. In addition, the depth of the portion 121X that connects to the second groove 122 in the first groove 121 is set deeper than the other portions 121Y. FIG. 16 shows a modification of the example according to the Example 1 shown in FIG. 10 in which the groove bottom of the first groove 121 becomes gradually shallower from the center toward both sides in the circumferential direction in stepped patterns. In addition, the depth of the portion 121X that connects to the second groove 122 in the first groove 121 is set deeper than the other portions 121Y.

Figure 17:
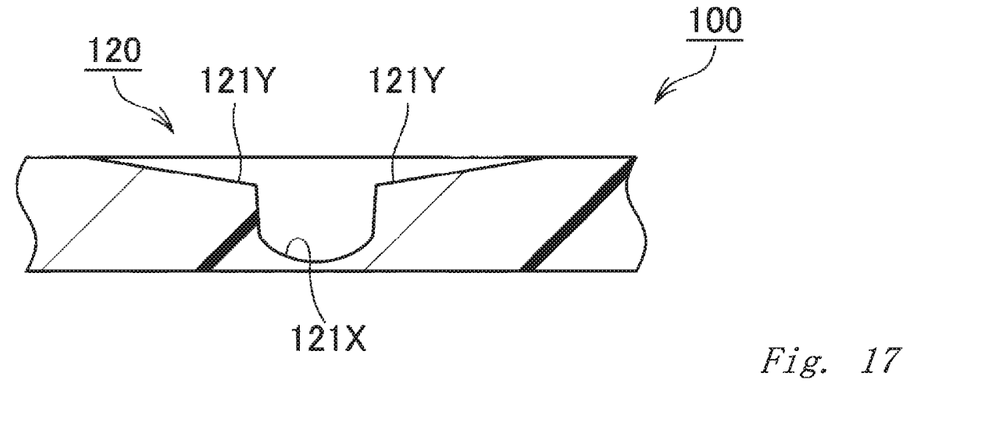
FIG. 17 is a schematic sectional view of the sealing ring according to the Example 2 of the present disclosure.
Figure 18:
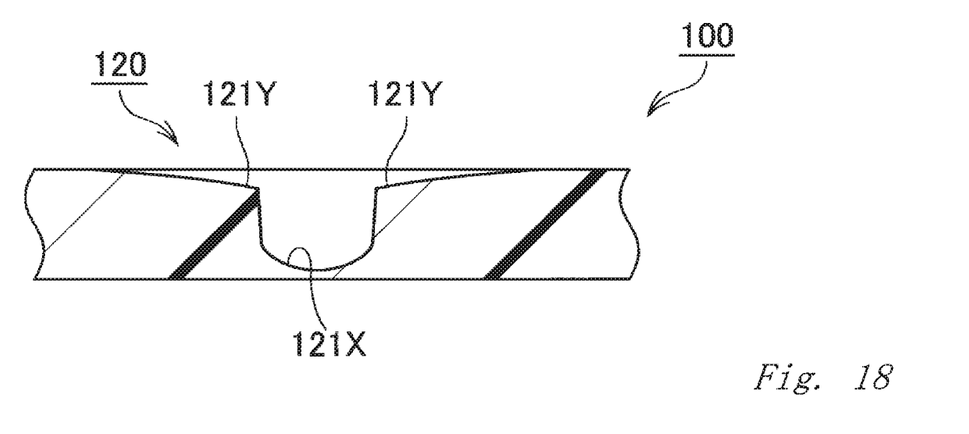
FIG. 18 is a schematic sectional view of the sealing ring according to the Example 2 of the present disclosure.
Figure 19:
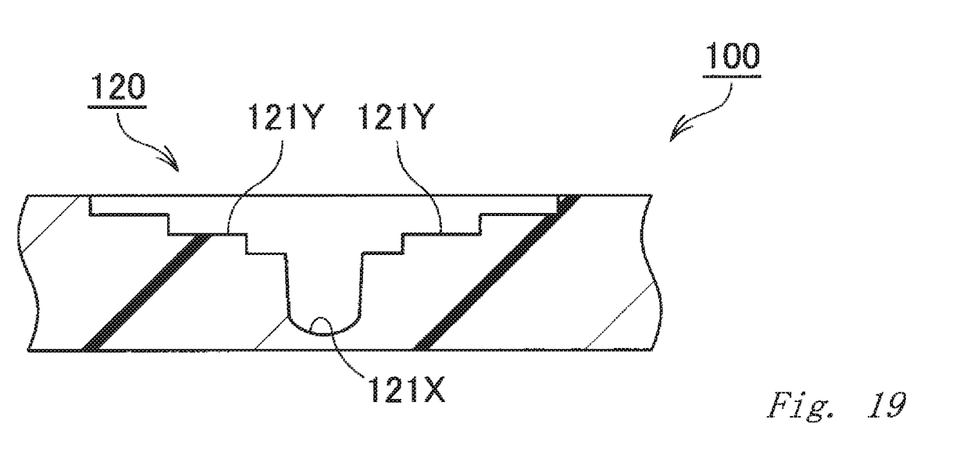
FIG. 19 is a schematic sectional view of the sealing ring according to the Example 2 of the present disclosure.

FIG. 17 shows a modification of the example according to the Example 1 shown in FIG. 8 in which the groove bottom of the first groove 121 becomes gradually shallower from the center toward both sides in the circumferential direction in a planar manner. In addition, the depth of the portion 121X that connects to the second groove 122 in the first groove 121 is set deeper than the other portions 121Y. Furthermore, a configuration is adopted in which a groove bottom of the portion 121X that connects to the second groove 122 in the first groove 121 forms a curved surface. FIG. 18 shows a modification of the example according to the Example 1 shown in FIG. 9 in which the groove bottom of the first groove 121 becomes gradually shallower from the center toward both sides in the circumferential direction in a manner of a curved plane. In addition, the depth of the portion 121X that connects to the second groove 122 in the first groove 121 is set deeper than the other portions 121Y. Furthermore, a configuration is adopted in which the groove bottom of the portion 121X that connects to the second groove 122 in the first groove 121 forms a curved surface. FIG. 19 shows a modification of the example according to the Example 1 shown in FIG. 10 in which the groove bottom of the first groove 121 becomes gradually shallower from the center toward both sides in the circumferential direction in stepped patterns. In addition, the depth of the portion 121X that connects to the second groove 122 in the first groove 121 is set deeper than the other portions 121Y.

Furthermore, a configuration is adopted in which the groove bottom of the portion 121X that connects to the second groove 122 in the first groove 121 forms a curved surface.

Moreover, the portions 121Y of the first groove 121 other than the portion that connects to the second groove 122 according to the present Example is set so that a depth of a deepest portion thereof is 50 µm or less.

With the sealing ring 100 according to the present Example configured as described above, since the second groove 122 and the portion 121X of the first groove 121 that connects to the second groove 122 in the dynamic pressure generating groove 120 are deep, an introduction amount of a fluid to be sealed can be increased. Accordingly, a dynamic pressure generating effect by the dynamic pressure generating groove 120 can be enhanced.

REFERENCE SIGNS LIST 100 sealing ring
110 abutment portion
120 dynamic pressure generating groove
121 first groove
122 second groove
200 shaft
210 annular groove
211 side wall surface
300 housing
X sliding region

The invention claimed is:

1. A sealing ring which is mounted to an annular groove provided on an outer circumference of a shaft and seals an annular gap between the shaft and a housing that rotate relative to each other to maintain fluid pressure of a region to be sealed that is configured such that the fluid pressure thereof changes,
   wherein the sealing ring includes an inner circumferential surface, an outer circumferential surface and a pair of side surfaces, one of the pair of side surfaces slides against a side wall surface on a low pressure side of the annular groove,
   a dynamic pressure generating groove disposed in the one of the pair of side surfaces of the sealing ring, the dynamic pressure generating groove includes
      a first groove radially spaced from the inner circumferential surface of the sealing ring and having a constant width in a radial direction along the entire length of the first groove in a circumferential direction and extending in the circumferential direction and
      a second groove that is recessed directly from the one of the pair of side surfaces which slides against the groove side wall surface and is narrower than the first groove in a circumferential direction and extending from a center position of the first groove in the circumferential direction to the inner circumferential surface of the sealing ring and guiding a fluid to be sealed into the first groove,
   the first groove is provided at a position within a sliding region which slides against the side wall surface, wherein end portions of the first groove are separated from the inner circumferential surface of the seal ring by inner walls which are coplanar with the one of the pair of side surfaces of the sealing ring, wherein the inner walls have a constant width in a radial direction,
   the sealing rind has a constant width in the axial direction at regions where the inner walls are provided and the constant width is equal to a width at a region where the inner walls are not provided,
   a portion of the first groove that connects to the second groove has the same depth as the second groove and is deeper than the other portions of the first groove, and
   a step, defining an abrupt deeper transitional region, is formed between the portion of the first groove that connects to the second groove and the other portions of the first groove, wherein a depth of the first groove on opposite sides of the step changes in the circumferential direction.

2. The sealing ring according to claim 1, wherein a groove bottom of the first groove is configured such that both end sides thereof are shallower than a center in the circumferential direction.

* * * * *